3,244,706
NOVEL ALKOXYTRIPHENYLACRYLIC ACID DERIVATIVES AND RELATED COMPOUNDS
Blaine M. Sutton, Philadelphia, Pa., assignor to Smith Kline & French Laboratories, Philadelphia, Pa., a corporation of Pennsylvania
No Drawing. Filed Apr. 9, 1963, Ser. No. 271,581
11 Claims. (Cl. 260—247.2)

This reaction relates to α-o-alkoxyphenyl-β,β-diphenylacrylic acids and esters having unusual pharmacological activity.

More specifically the compounds of this invention have the basic structural formula:

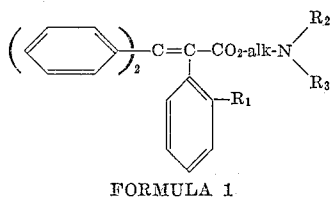

FORMULA 1 in which:

$R_1$ is a lower alkoxy having from 1 to 4 carbon atoms inclusive, $R_2$ and $R_3$ are lower alkyl having from 1 to 8, preferably 1 to 4, carbon atoms or when taken together are basic heterocyclic groups such as piperidyl, morpholinyl, pyrrolidinyl or N-loweralkylpiperazinyl, alk is a straight or branched alkylene chain of from 2 to 4 carbon atoms separating the hetero atoms to which it is attached by at least two carbons.

Preferred compounds are those in which $R_1$ is methoxy or ethoxy, alk is ethylene or propylene and $R_2$ and $R_3$ are methyl or ethyl.

Also included in this invention in addition to the basic esters are nontoxic acid addition or quaternary salts thereof as well as the N-oxide derivatives. The salts are formed in conventional methods with such pharmaceutically acceptable acids as sulfuric, hydrochloric, maleic, ethanedisulfonic, phosphoric, sulfamic, pamoic, etc. acids or with pharmaceutically acceptable active quaternizing agents as known to the art such as lower alkyl chlorides, iodides, bromides or sulfates. The N-oxide derivatives are prepared by oxidation of the desired base of Formula 1 using mild oxidizing agents such as hydrogen peroxide in the cold. Salts of the N-oxide derivatives as discussed above may also be prepared and are a part of this invention. Acid addition salts which may have toxicity to animal organisms are often of use as intermediates to prepare nontoxic salts or the N-oxide derivatives. The acid addition salts and N-oxide derivatives are preferred aspects of this invention.

The compounds described are important in controlling lipid metabolism of the body and are unusual in having potent cholesterol lowering activity as well as activity as weight control agents.

The criticality of the skeletal structure on biological activity is apparent from my discovery that the desirable activity is lost when the alkoxy group is moved to the para position or is replaced by other radicals common to the art such as chloro. The diarylphenylacrylic acid nucleus is similarly necessary since forming the lactic acid congener diminishes activity dramatically. The aminoalkyl esters have been further found to be particularly active over the acids and are therefore the preferred aspects of this invention.

The novel activity found is demonstrated by the fact that potent cholesterol lowering is present in both the plasma and the livers of test animals with lean livers present following treatments using standard test procedures. There is also no undesirable build-up of abnormal steroids such as desmosterol in the body of the animal.

The α-(o-alkoxyphenyl)-β,β-diarylacrylic acids are also a part of this invention since they have novel liver cholesterol lowering activity in addition to their use as intermediates. These acids may be used per se or as their nontoxic pharmaceutically acceptable salts with cations such as the alkali metal group. These acids are represented by the following formula:

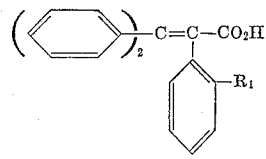

FORMULA 2 in which $R_1$ is as defined above and is preferably methoxy.

The acids of Formula 2 are prepared by reacting in excess a Grignard reagent of an o-halophenyl lower alkyl ether with a diarylpyruvic acid to give the substituted triaryllactic acid. This compound is dehydrated by reacting with a dehydrating agent or preferably by heating at temperatures above the melting point of the lactic acid to give the desired triarylacrylic acid of Formula 2.

The triarylacrylic acids are converted into the preferred alkylaminoalkyl esters by esterification methods, for example, by treating an alkali metal salt of the acrylic acid with a reactive aminoalkyl halide such as the chloride, bromide or iodide. The reaction is usually carried out in an organic solvent in which the reactants are substantially soluble such as tetrahydrofuran, methanol, ethanol, etc. or mixtures thereof. The reaction is often completed by heating usually at reflux for periods up to 24 hours.

For practical use the compounds of this invention are combined with a carrier in pharmaceutical dosage unit form such as in a capsule, tablet or suspension then administered internally, usually orally, in a daily dosage regimen, to a subject having either an abnormally high cholesterol level or excess weight. The term "lower alkyl" or "lower alkoxy" where used herein means radicals containing straight or branched alkyl groups of from 1 to 8 carbon atoms inclusive, preferably from 1 to 2 carbon atoms.

The nub of this invention is in the compounds described herebefore. The basic structure of this invention necessary for the desirable biological activities described is a β,β-diaryl-α-o-alkoxyphenylacrylic acid alkylaminoalkyl ester. One skilled in the art will realize that many variations in the β,β-diphenyl groups can be carried out such as substitution by halo, lower alkoxy, lower alkyl or trifluoromethyl groups or replacement by thienyl or furyl radicals. Such obvious variations are considered part of this invention. The preparation of the compounds of this invention is illustrated by the following examples.

*Example 1*

An ethereal solution of 91 g. (0.38 mole) of diphenyl pyruvic acid is added dropwise to a Grignard mixture prepared from 247 g. (1.32 mole) of o-bromoanisole and 31.6 g. (1.23 g. atom) of magnesium in 1500 ml. of ether with cooling and stirring. After heating at reflux for two hours, the mixture is cooled and decomposed with 5% hydrochloric acid. The ether layer is washed with water, then extracted with 5% sodium hydroxide solution. The basic extracts are neutralized with 36% hydrochloric acid to separate 62 g. of α-(o-anisyl)-β,β-diphenyllactic acid as a white solid from toluene, M.P. 194–195° C.

Four grams (0.0115 mole) of the lactic acid is heated at 210–215° C. for 10–15 minutes with occasional stirring. After recrystallizing the crude product from benzene, 2.85 g. (74%) of white solid, α-(o-anisyl)-β,β-diphenylacrylic acid, M.P. 195–196° C., is obtained.

A solution of 11.8 g. (0.036 mole) of the acrylic acid in 150 ml. of tetrahydrofuran is treated with a solution of 2.3 g. (0.04 mole) of potassium hydroxide in 50 ml. of ethanol followed by the dropwise addition of 7.1 g. (0.054 mole) of diethylaminoethyl chloride. The mixture is then heated at reflux for 4 hours. The solvent is removed in vacuo and the residue extracted with ether. After washing the ethereal extracts with 2% sodium hydroxide solution and water, the dried ether extract is evaporated to give 12 g. of white solid, diethylaminoethyl α-(o-anisyl)-β,β-diphenylacrylate, M.P. 73–74.5° C.

Part of the ester (500 mg.) is dissolved in ether and reacted with dry hydrogen chloride gas to give the hydrochloride salt, M.P. 201–203° C.

Another portion of the ester (500 mg.) is heated on the steam bath in ethyl acetate with 1 ml. of methyl iodide. Evaporation gives the methiodide quaternary salt.

The ester (1 g.) in methanol and an excess amount of ethylbromide is heated at 50° C. in a closed container. Cooling and evaporating the solvent gives the ethyl bromide quaternary salt of diethylaminoethyl α-(o-anisyl)-β,β-diphenylacrylate, M.P. 185–188° C.

*Example 2*

A solution of 11 g. (0.26 mole) of the acrylate ester from Example 1 in 300 ml. of methanol and 32 ml. of 30% hydrogen peroxide is reacted at refrigerator temperature for 10 days. The excess peroxide is decomposed with platinum oxide, the solution filtered and the filtrate evaporated to give the N-oxide derivative of diethylaminoethyl α-(o-anisyl)-β,β-diphenylacrylate as an amber oil.

The oil is dissolved in a minimum amount of isopropanol and treated with isopropanolic hydrogen chloride to give an oil which crystallizes upon trituration with ether, the hydrochloride salt, M.P. 157–159° C. (dec.).

*Example 3*

The Grignard reagent in Example 1 is replaced with that prepared from an equimolar portion of o-bromophenetole and magnesium to give α-(o-phenetyl)-β,β-diphenyllactic acid and α-(o-phenetyl)-β,β-diphenylacrylic acid successively.

A mixture of 12 g. of the acrylic acid in 175 ml. of tetrahydrofuran, 2.3 g. of alcoholic potassium hydroxide and 7.5 g. of dimethylaminoethyl bromide is heated at reflux for 6 hours. The solvent is evaporated to leave a syrup which is extracted with ether. The dried ether extract is reacted with hydrogen bromide gas to give dimethylaminoethyl α-(o-phenetyl)-β,β-diphenylacrylate hydrobromide.

*Example 4*

Substituting equimolar amounts of N-pyrrolidinylpropyl bromide in the esterification reaction of Example 1 gives N-pyrrolidinylpropyl α-(o-anisyl)-β,β-diphenylacrylate. Substituting N-piperidylisopropyl chloride in Example 3 gives N-piperidylisopropyl α-(o-phenetyl)-β,β-diphenylacrylate hydrobromide. Using N-morpholinylethyl bromide in the process of Example 1 gives N-morpholinylethyl α-(o-anisyl)-β,β-diphenylacrylate and, using ethanedisulphonic acid in ethyl acetate, its ethanedisulfonate salt. Substituting N-methylpiperazinylethyl chloride in Example 1 gives N-methylpiperazinylethyl α-(o-anisyl)-β,β-diphenylacrylate and its dimaleate salt using an excess of maleic acid.

*Example 5*

A mixture of 10 g. of di-α-thienylpyruvic acid, prepared by the method of E. P. Kohler et al., J. Am. Chem. Soc., 53,218 (1931), is reacted with an excess of o-bromoanisole Grignard reagent in ether as in Example 1. Working up as described gives α-(o-anisyl)-β,β-di-α-thienyllactic acid. Heating the crude acid at 200–215° C. gives α-(o-anisyl)-β,β-di-α-thienylacrylic acid. This acid (5 g.) is esterified using 2 g. of sodium hydroxide and 4 g. of diethylaminoethyl iodide in ethanol-tetrahydrofuran to give diethylaminoethyl α-(o-anisyl)-β,β-di-α-thienylacrylate. The ester (500 mg.) in ether-ethanol is reacted with ethanolic hydrogen chloride to give the hydrochloride salt.

*Example 6*

Substituting equimolar amounts of di-(o-fluorophenyl)-pyruvic acid, prepared by the Kohler method of using o-fluorobenzophenone, in Example 1 gives diethylaminoethyl α-(o-anisyl)-β,β-di-(o-fluorophenyl)-acrylate. This compound (500 mg.) is reacted with ethyl chloride in ether to give the ethochloride quaternary salt.

What is claimed is:

1. A compound selected from the group consisting of a base, its nontoxic salt with a pharmaceutically acceptable acid, its pharmaceutically acceptable quaternary salt formed with a member selected from the group consisting of a lower alkyl chloride, lower alkyl iodide, lower alkyl bromide and lower alkyl sulfate and its N-oxide derivative, said base being of the structure:

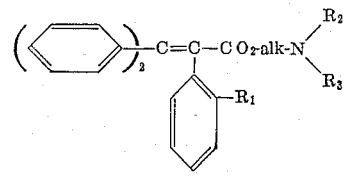

in which:
  $R_1$ is lower alkoxy of from 1 to 4 carbon atoms;
  $R_2$ and $R_3$ are members selected from the group consisting of lower alkyl of from 1 to 8 carbon atoms and, when taken together with the nitrogen atom, piperidyl, morpholinyl, pyrrolidinyl and N-methylpiperazinyl; and
  alk is alkylene of from 2 to 4 carbon atoms.

2. Diethylaminoethyl α-(o-anisyl)-β,β-diphenylacrylate.
3. A nontoxic salt of diethylaminoethyl α-(o-anisyl)-β,β-diphenylacrylate with a pharmaceutically acceptable acid.
4. Diethylaminoethyl α-(o-anisyl)-β,β-diphenylacrylate hydrochloride.
5. Diethylaminoethyl α-(o-anisyl)-β,β-diphenylacrylate-N-oxide.
6. A nontoxic salt of diethylaminoethyl α-(o-anisyl)-β,β-diphenylacrylate-N-oxide with a pharmaceutically acceptable acid.
7. Diethylaminoethyl α-(o-anisyl)-β,β-di-(α-thienyl)-acrylate.
8. A nontoxic salt of diethylaminoethyl α-(o-anisyl)-β,β-di-(α-thienyl)-acrylate with a pharmaceutically acceptable acid.
9. α-(o-Anisyl)-β,β-diphenylacrylic acid.
10. α-(o-Phenetyl)-β,β-diphenylacrylic acid.
11. α-(o-Anisyl)-β,β-di-(α-thienyl)-acrylic acid.

References Cited by the Examiner

UNITED STATES PATENTS

| | | | |
|---|---|---|---|
| 2,430,891 | 11/1947 | Shelton et al. | 260—520 |
| 2,576,230 | 11/1951 | Krimmel | 260—294.3 |
| 2,690,442 | 9/1954 | Krimmel | 260—326.3 |

OTHER REFERENCES

Nishizuka et al.: Chemical Abstracts, vol. 51 (1957), pages 16880–1.

The Van Nostrand Chemist's Dictionary, Van Nostrand Co., New York, New York (1953), page 44.

WALTER A. MODANCE, *Primary Examiner.*

NICHOLAS S. RIZZO, *Examiner.*